United States Patent [19]

Ito et al.

[11] Patent Number: 5,114,994
[45] Date of Patent: May 19, 1992

[54] EPOXY RESIN COMPOSITION FOR SEALING SEMICONDUCTOR

[75] Inventors: Hiromi Ito; Ichiro Takahashi; Hirozoh Kanegae, all of Hyogo, Japan

[73] Assignee: Mitsubishi Denki Kabushiki Kaisha, Tokyo, Japan

[21] Appl. No.: 670,433

[22] Filed: Mar. 18, 1991

[30] Foreign Application Priority Data

Mar. 23, 1990 [JP] Japan .................................. 2-75128
Jul. 24, 1990 [JP] Japan .................................. 2-198272

[51] Int. Cl.$^5$ ...................... C08L 83/04; C08L 63/00
[52] U.S. Cl. .................................. 523/436; 523/435; 523/476
[58] Field of Search ................. 525/476; 523/435, 436

[56] References Cited

U.S. PATENT DOCUMENTS

| 4,624,998 | 11/1986 | Keil .................. 523/435 |
| 4,701,482 | 10/1987 | Itoh et al. ............ 523/435 |
| 4,720,515 | 1/1988 | Iji et al. ............. 523/435 |
| 5,034,436 | 7/1991 | Takahashi et al. ...... 523/435 |

FOREIGN PATENT DOCUMENTS

| 56-4647 | 1/1981 | Japan . |
| 58-108220 | 6/1983 | Japan . |
| 58-174416 | 10/1983 | Japan . |
| 58-184204 | 10/1983 | Japan . |
| 59-8717 | 2/1984 | Japan . |
| 59-30820 | 2/1984 | Japan . |
| 59-58024 | 4/1984 | Japan . |
| 59-113021 | 6/1984 | Japan . |
| 59-226066 | 12/1984 | Japan . |
| 62-9248 | 2/1987 | Japan . |
| 62-84147 | 4/1987 | Japan . |
| 62-254454 | 6/1987 | Japan . |
| 63-46216 | 2/1988 | Japan . |
| 64-29450 | 1/1989 | Japan . |
| 2-11654 | 1/1990 | Japan . |
| 2-28213 | 1/1990 | Japan . |

*Primary Examiner*—Kriellion S. Morgan
*Assistant Examiner*—Christopher P. Rogers
*Attorney, Agent, or Firm*—Lowe, Price, LeBlanc & Becker

[57] ABSTRACT

Disclosed herein is an epoxy resin composition for sealing a semiconductor, which contains a flexibilizer, epoxy resin, a hardener, a hardening accelerator, a filler, a mold releasing agent, a colorant and a finishing agent. The flexibilizer is prepared from silicone containing hydroxyphenyl groups on ends of and/or in its molecules, which is formed of a copolymer of denatured silicone oil A having hydroxyphenyl groups, denatured silicone oil B having epoxy groups and/or bifunctional epoxy resin having epoxy groups on both ends.

In addition to heat resistance, moisture resistance, a low elastic modulus, a low thermal expansion coefficient and a high glass-transition temperature, the epoxy resin composition according to the present invention has toughness which is higher than that of a conventional one, due to fine dispersion of silicone.

28 Claims, No Drawings

EPOXY RESIN COMPOSITION FOR SEALING SEMICONDUCTOR

BACKGROUND OF THE INVENTION

1. Field of the Invention

The present invention relates to an epoxy resin composition for sealing a semiconductor, and more particularly, it relates to an epoxy resin composition for sealing a semiconductor, in which a novel copolymer is employed as a flexibilizer.

2. Description of the Background Art

In recent years, a semiconductor element has been increased in chip area and reduced in resin layer thickness, following high density integration. When a semiconductor part is sealed with a conventional epoxy resin composition in a fabrication step, it easily causes problems such as cracking of the chip, disconnection of a bonding wire, sliding of an aluminum wire, cracking of sealing resin, and the like, which are critical defects for the semiconductor part. This is because the conventional epoxy resin composition for sealing a semiconductor has been mainly developed in consideration of improvement in heat resistance and moisture resistance, and a hardened body thereof is so inferior in flexibility that significant stress is applied to the element.

As to reduction of stress in an epoxy resin composition for sealing a semiconductor, generally known are a method of decreasing a thermal expansion coefficient of resin for reducing thermal distortion, and a method of decreasing an elastic modulus for reducing stress which is caused by thermal distortion. In order to increase a temperature region having small thermal distortion while maintaining heat resistance and moisture resistance, it is necessary to increase a glass-transition temperature.

The aforementioned stress, which is caused by thermal distortion, can be reduced by addition of a flexibilizer. However, in a method of reducing the elastic modulus by blending a generally used flexibilizer such as long-chain alkylene polyamine, polyoxyalkylene glycol or bisphenol A diglycidyl ether having long-chain alkylene oxide, for example, the glass-transition temperature of a hardened body is significantly reduced, to cause reduction in heat resistance and moisture resistance (refer to Japanese Patent Publication No. 59-8718, Japanese Patent Laying-Open Nos. 59-30820 and 59-226066, etc.).

On the other hand, an elastomer denatured flexibilizer obtained from polybutadiene having functional groups which are reactive with epoxy resin on both ends, a copolymer of butadiene and acrylonitrile or the like has been also considered as a flexibilizer which causes merely small reduction in moisture resistance and glass-transition temperature (refer to Japanese Patent Laying-Open No. 58-174416, Japanese Patent Publication No. 58-108220, Japanese Patent Laying-Open No. 58-184204, Japanese Patent Publication No. 62-9248, Japanese Patent laying-Open Nos. 59-113021 and 59-58024, etc.). In such an elastomer denatured flexibilizer, however, unsaturated bonds contained in the elastomer are oxidized and deteriorated under a high temperature, leading to a problem of disappearance of the flexibilizing effect.

Also known is a method of dispersing silicone resin or silicone rubber having a low elastic modulus, which is an excellent flexibilizer in view of electric characteristics and thermal stability under a high temperature (refer to Japanese Patent Laying-Open Nos. 62-84147, 56-4647 and 64-29450 etc.). However, moisture permeability of a hardened body obtained by this method is increased since silicone resin is inferior in adhesion with a metal while silicone rubber is inferior in interfacial strength with respect to an epoxy matrix. Thus, this method is inferior in reliability due to poor moisture resistance and small mechanical strength.

The inventors have already found that an epoxy resin composition employing a pre-reactant of denatured silicone oil having epoxy groups and phenol novolak resin can provide a hardened body which has heat resistance and moisture resistance, as well as a low elastic modulus (refer to Japanese Patent Publication No. 62-83158). They also have found that a pre-reactant of denatured silicone oil having hydroxyphenyl groups and epoxy resin provides a hardened body which has heat resistance and moisture resistance, as well as a low elastic modulus, a low thermal expansion coefficient and a high glass-transition temperature (refer to Japanese Patent Application Nos. 63-115269 and 63-161849).

SUMMARY OF THE INVENTION

An object of the present invention is to obtain an epoxy resin composition for sealing a semiconductor, which provides a hardened body having higher toughness than a conventional one due to fine dispersion of silicone, in addition to the characteristics provided in the aforementioned resin composition, i.e., heat resistance, moisture resistance, a low elastic modulus, a low thermal expansion coefficient and a high glass-transition temperature.

The inventive epoxy resin composition for sealing a semiconductor contains silicone containing hydroxyphenyl groups on ends of and/or in its molecules, which is prepared from a copolymer of denatured silicone oil A having hydroxyphenyl groups, being expressed in the following general formula (I):

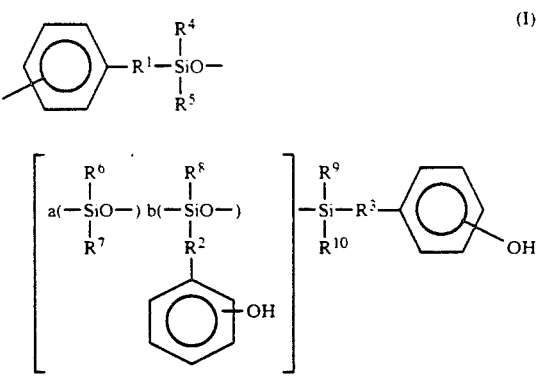

where
R$^1$ to R$^3$ represent bivalent organic groups respectively, R$^4$ to R$^{10}$ represent alkyl groups having carbon numbers of 1 to 10, alkoxy groups having carbon numbers of 1 to 10, hydroxyalkyl groups or phenyl groups having carbon numbers of 1 to 10, or fluorine displaced alkyl groups having carbon numbers of 1 to 10 respectively, a represents an integer in a range of 5 to 300, and b represents an integer in a range of 0 to 10, $0 \leq [b/(a+b)] \leq 0.32$, denatured silicone oil B having epoxy groups, being expressed in the following general formula (II):

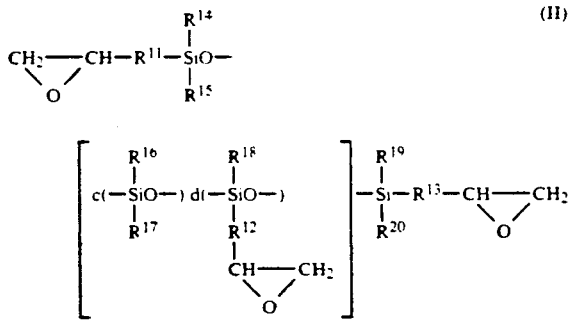

where
R$^{11}$ to R$^{20}$ represent bivalent organic groups respectively. R$^{14}$ to R$^{20}$ represent alkyl groups having carbon numbers of 1 to 10, alkoxy groups having carbon numbers of 1 to 10, hydroxyalkyl groups or phenyl groups having carbon numbers of 1 to 10, or fluorine displaced alkyl groups having carbon numbers of 1 to 10 respectively. c represents an integer in a range of 5 to 300, and d represents an integer in a range of 0 to 10, $0 \leq [d/(c+d)] \leq 0.32$, and/or bifunctional epoxy resin having epoxy groups on both ends, being expressed in the following general formula (III):

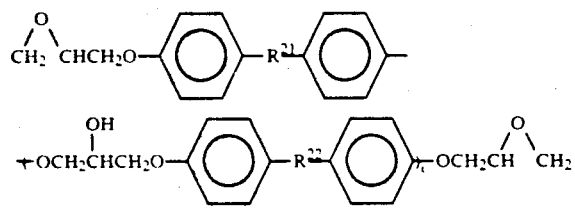

where
R$^{21}$ and R$^{22}$ represent direct-coupling or bivalent organic groups and e represents an integer in a range of 0 to 20; hydrogen atoms of benzene rings may be displaced) as a flexibilizer, with epoxy resin, a hardener, a hardening accelerator, a filler, a mold releasing agent, a colorant and a finishing agent.

DESCRIPTION OF THE INVENTION

The flexibilizer employed in the present invention is a block or graft copolymer which is prepared by reacting phenolic hydroxyl groups contained in denatured silicone oil A with epoxy groups contained in another denatured silicone oil B and/or epoxy groups contained in bifunctional epoxy resin for providing hydrocarbon parts between polymer chains of silicone, whereby it is possible to increase compatibility between silicone, which is a flexibilizing component, and epoxy resin, which is a main agent, thereby enabling toughening. Further, the flexibilizer containing the hydroxyphenyl groups is reactive with epoxy resin, whereby exudation and mold releasability are improved in molding.

Specifically, the epoxy resin employed as a main agent for the inventive composition may be prepared from multifunctional epoxy resin such as cresol novolak epoxy resin, phenol novolak epoxy resin, alkylbenzene denatured phenol novolak epoxy resin, phenol halide novolak epoxy resin, bisphenol A novolak epoxy resin or tris(glycidoxyphenyl)methane, for example. Such novolak or multifunctional epoxy resin may be replaced by bifunctional epoxy resin such as bisphenol A epoxy resin, bisphenol S epoxy resin, bisphenol F epoxy resin, biphenyl epoxy resin, heterocyclic chain epoxy resin such as naphthalene, or any epibis type epoxy resin having epoxy groups on both ends. Such epoxy resin may have various substitutional groups. It is noted that the above examples are not restrictive.

The epoxy resin may be employed independently or in combination of two or more types.

The hardener employed in the present invention may be prepared from a phenol hardener such as multifunctional phenol resin such as phenol novolak resin, cresol novolak resin, alkyl denatured phenol resin, bisphenol A novolak resin or tris(hydroxyphenyl)methane, acid anhydride, or a multifunctional amino compound, for example, but is not restricted to this. Such material may be employed independently or in combination of two or more types.

Silicone containing hydroxyphenyl groups on ends of and/or in its molecules, which is employed as a flexibilizer in the present invention, is prepared from a copolymer of denatured silicone oil A having hydroxyphenyl groups, being expressed in the following general formula (I):

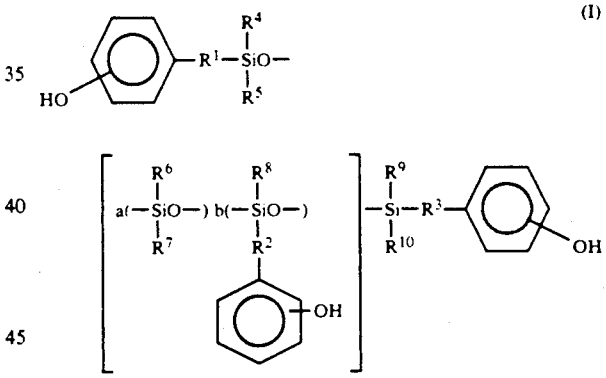

denatured silicon oil B having epoxy groups, being expressed in the following general formula (II):

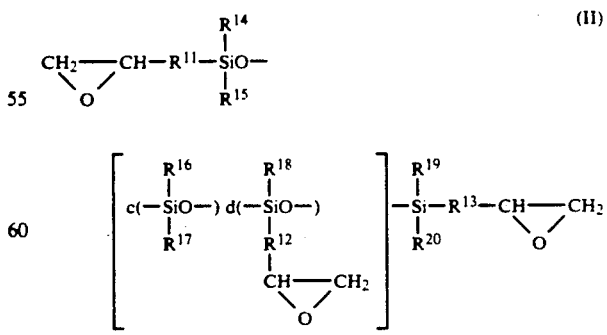

and/or bifunctional epoxy resin having epoxy groups on both ends, being expressed in the following general formula (III):

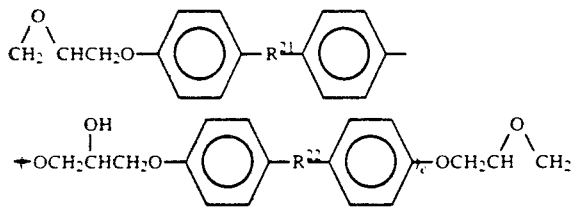

(III)

The order of repeating units in the general formula (I) or (II) is not restricted but the same may be in random or block copolymerization.

Therefore, the flexibilizer employed in the present invention may be prepared from a copolymer of the denatured silicone oil A and the denatured silicone oil B, that of the denatured silicone oil A and the bifunctional epoxy resin, that of the denatured silicon oil A, the denatured silicone oil B and the bifunctional epoxy resin, or a combination of these copolymers.

When the denatured silicone oil B is employed, it is possible to provide a highly compatible organic bonding part between the denatured silicone oil A and the denatured silicone oil B, thereby attaining silicone oil which has high compatibility. When the bifunctional epoxy resin is employed, the highly compatible bifunctional epoxy resin is bonded between two parts of the denatured silicone oil A, for example, to provide toughness.

The denatured silicone oil A or B serves as a compatibilizer when the same is not more than 2000 in mean molecular weight, while such silicone oil serves as an elasticity reducing agent when the same is greater than 2000 in mean molecular weight.

Symbols $R^1$ to $R^3$ in the above general formula (I) represent bivalent organic groups, such as alkylene groups having carbon numbers of 1 to 5 such as methylene groups, ethylene groups, propylene groups or butylene groups, ether structures such as —$C_3H_6OC_3H_6$—, heterocyclic structures, bicyclo chains, biphenyl chains and the like. The number b of $R^2$ may be of the same type or of different types from each other.

Symbols $R^4$ to $R^{10}$ represent alkyl groups having carbon numbers of 1 to 10, preferably of 1 to 5, such as methyl groups, ethyl groups, propyl groups, butyl groups, isopropyl groups, isobutyl groups, t-butyl groups, pentyl groups or isopentyl groups, alkoxy groups having carbon numbers of 1 to 10, preferably of 1 to 5, such as methoxy groups, ethoxy groups or propoxy groups, hydroxyalkyl groups or phenyl groups having carbon numbers of 1 to 10, preferably of 1 to 5, such as $HOCH_2$—, $(HO)_2CH$—, $HO\text{-}CH_2\text{---}CH_2$—, $HO\text{---}C_3H_6$— or $(HOCH_2)_2CH$—, or fluorine displaced alkyl groups having carbon numbers of 1 to 10, preferably of 1 to 5, such as $CF_3CH_2CH_2$— or $CF_3(CF_2)CH_2CH_2$—. The number a of $R^6$, the number a of $R^7$ and the number b of $R^8$ may be of the same types or of different types from each other, respectively.

Symbol a represents an integer in a range of 5 to 300, preferably in a range of 7 to 250. If the number a is less than 5, the flexibilizer has no effect and heat resistance is reduced, while strength is extremely reduced if the number a exceeds 300.

Further, b/(a+b) is in a range of 0 to 0.32, preferably in a range of 0 to 0.25. If b/(a+b) exceeds 0.32, gelation may be caused and an elastomer effect may be reduced because of too many functional groups.

The hydroxyl equivalent of the hydroxyphenyl groups contained in the denatured silicone oil A is preferably in a range of 100 to 13000, and more preferably, in a range of 250 to 8000. Further, the number of the hydroxyphenyl groups per molecule is preferably in a range of 2 to 12. If the said hydroxyl equivalent and the number of the hydroxyphenyl groups per molecule are out of the aforementioned ranges, the following problems are caused: When the number of the hydroxyphenyl groups is too small, it is difficult to attain sufficient reaction with the denatured silicone oil B and/or the bifunctional epoxy resin. If the number of the hydroxyphenyl groups is too large, on the other hand, gelation may be caused in reaction.

Preferable examples of the denatured silicone oil A are as follows:

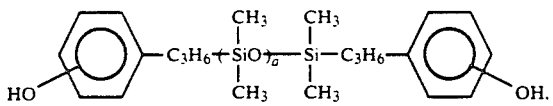

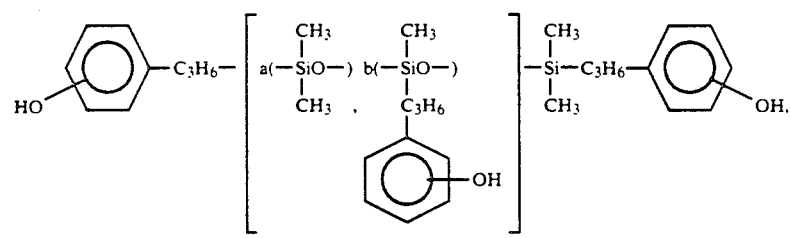

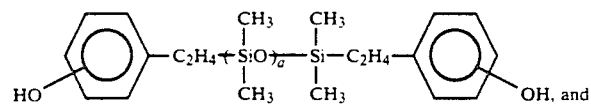

-continued

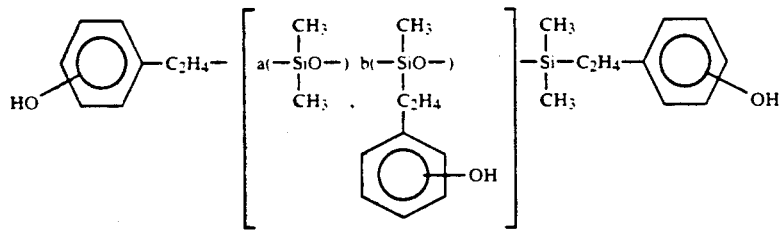

Symbols $R^{11}$ to $R^{13}$ in the above general formula (II) expressing the denatured silicone oil B represent bivalent organic groups which are similar to $R^1$ to $R^3$, respectively. The number d of $R^{12}$ may be of the same type or of different types from each other.

Symbols $R^{14}$ to $R^{20}$ represent alkyl groups, alkoxy groups, hydroxyalkyl groups, phenyl groups or fluorine displaced alkyl groups which are similar to $R^4$ to $R^{10}$, respectively. The number c of $R^{16}$, the number c of $R^{17}$ and the number d of $R^{18}$ may be of the same types or of different types from each other, respectively.

Symbol c represents an integer in a range of 5 to 300, preferably in a range of 7 to 250. If the number c is less than 5, the flexibilizer has no effect and heat resistance is reduced, while strength is extremely reduced if the number c exceeds 300.

Further, d/(c+d) is in a range of 0 to 0.32, preferably in a range of 0 to 0.25. If d/(c+d) exceeds 0.32, gelation may be caused and an elastomer effect may be reduced because of too many functional groups.

The epoxy equivalent of the epoxy groups contained in the denatured silicone oil B is preferably in a range of 100 to 13000, and more preferably, in a range of 250 to 8000. The number of the epoxy groups per molecule is preferably in a range of 2 to 12. If the epoxy equivalent and the number of the epoxy groups per molecule are out of the above ranges, the following problems are caused: When the number of the epoxy groups is too small, it is difficult to attain sufficient progress of reaction with the silicon oil A. If the number of the epoxy groups is too large, on the other hand, gelation may be caused in reaction.

Preferable examples of the denatured silicone oil B are as follows:

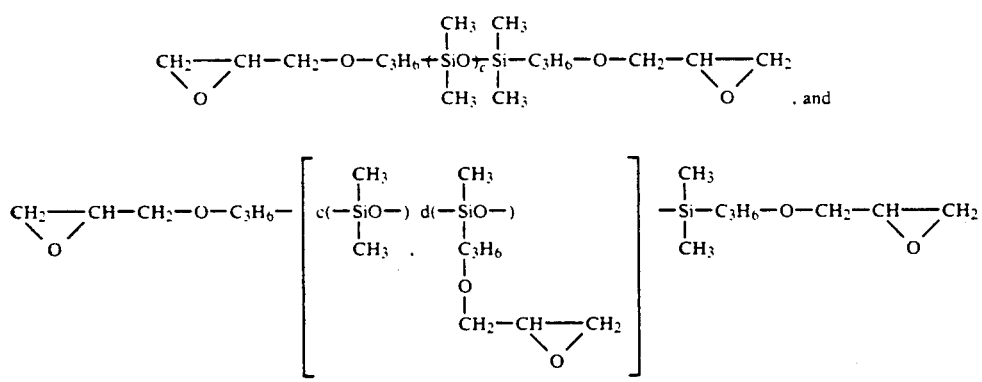

Symbols $R^{21}$ and $R^{22}$ in the above general formula (III) expressing the bifunctional epoxy resin represent direct-coupling or bivalent organic groups which are similar to $R^1$ to $R^3$, respectively. The number e of $R^{22}$, may be of the same type or of different types from each other.

Symbol e represents an integer in a range of 0 to 20, preferably in a range of 0 to 16. If the number e exceeds 20, the chains are too long and heat resistance is reduced.

The hydrogen atoms of the benzene rings in the general formula (III) may be displaced by alkyl groups such as methyl groups, ethyl groups, propyl groups or t-butyl groups, or fluorine groups, for example.

Preferable examples of the bifunctional epoxy resin are as follows:

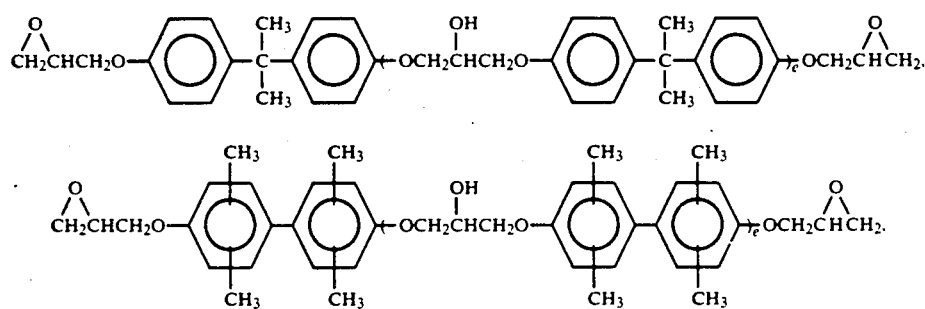

-continued

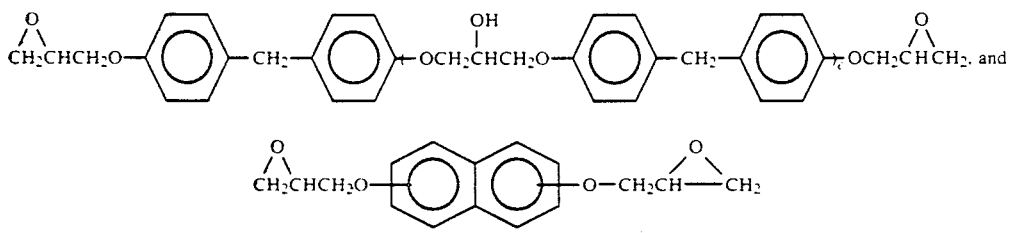

The flexibilizer employed in the present invention is preferably prepared by reacting at least one type of the denatured silicone oil A with at least one type of the denatured silicone oil B and/or at least one type of the bifunctional epoxy resin at such a rate that the equivalent ratio (phenolic hydroxyl groups/epoxy groups) of hydroxyl groups of hydroxyphenyl groups (also referred to as phenolic hydroxyl groups) contained in the denatured silicone oil A to epoxy groups contained in the denatured silicone oil B and/or the bifunctional epoxy resin is 1 to 30, more preferably 5 to 30 if the silicone oil A contains hydroxyphenyl groups in its molecules, in order to prevent gelation.

At least 70 percent, more preferably at least 90 percent, of the epoxy groups contained in the denatured silicone oil B and the bifunctional epoxy resin are preferably reacted with the phenolic hydroxyl groups contained in the denatured silicone oil A. If the number of unreacted epoxy groups is increased, it is difficult to attain reaction with the epoxy resin.

In general, the denatured silicone oil A is reacted (pre-reacted) with the denatured silicone oil B and/or the bifunctional epoxy resin through a catalyst prepared from an amine compound, an imidazole compound, a phosphorus compound or the like, under a nitrogen atmosphere.

Examples of the amine compound serving as a catalyst are trimethyl amine, tetramethyl ammonium hydroxide and the like, and examples of the imidazole compound are 2-ethyl-4-methylimidazole, 2-methylimidazole and the like, while examples of the phosphorus compound are triphenylphosphine, tri-t-butylphosphine, organic salts thereof, and the like.

The flexibilizer contained in the inventive composition is preferably at a rate $X/(X+Y)$ of 0.03 to 0.4, more preferably of 0.05 to 0.2, assuming that X represents the weight of the denatured silicone oil A, or the total weight of the denatured silicone oil A and the denatured silicone oil B if the denatured silicone oil B is employed, and Y represents the weight of organic components (including the bifunctional epoxy resin for the flexibilizer, if the same is employed) such as the epoxy resin employed as a main agent, a hardener and the like. If this value is less than 0.03, not only the effect of reducing the elastic modulus of the as-formed compact and improvement of the glass-transition temperature are decreased, but reduction of the thermal expansion coefficient is apt to be decreased. If the value exceeds 0.4, on the other hand, mechanical strength is reduced.

In the inventive composition, a ratio (epoxy groups/groups concerning reaction with epoxy groups) of the total equivalent of the epoxy groups contained in the epoxy resin employed as a main agent and those contained in the flexibilizer to the total equivalent of groups concerning reaction with the epoxy groups, such as the phenolic hydroxyl groups contained in the hardener and the flexibilizer and the like, is preferably in a range of 0.7 to 1.3, in order to attain the object of the present invention.

The hardening accelerator employed in the present invention is not particularly restricted so far as the same is selected from ordinary catalysts such as a phosphorus compound represented by phosphine such as triphenylphosphine, imidazole such as 2-methylimidazole, 2-ethyl-4-methylimidazole or the like, tertiary amine, 1,8-diazabicyclo(5,4,0)undecene-7, its organic salt, and the like. These materials may be employed independently or in combination of two or more types.

The hardening accelerator is preferably added in an amount of 0.03 to 2 percent by weight, and more preferably, 0.05 to 1 percent by weight in the inventive composition. If the amount of the hardening accelerator exceeds 2 percent by weight, difficulty may be caused in molding since gelation is too fast, while mechanical strength of the hardened body may be rendered insufficient if the amount is less than 0.03 percent by weight, since hardening is too slow.

The filler employed in the present invention is not particularly restricted. Examples of the filler are a pulverized substance such as crushed silica from natural or synthetic silica, spherical silica or the like, talc, mica, silicon nitride, alumina and the like. These materials may be employed independently or in combination of two or more types.

The amount of the inorganic filler is preferably 250 to 2000 parts by weight, and more preferably, 400 to 1600 parts by weight with respect to the total amount of 100 parts by weight of the epoxy resin employed for the inventive composition. If the amount of the inorganic filler is less than 250 parts by weight, strength, heat resistance and shock resistance of the as-formed hardened body are reduced, while flowability of the composition may be reduced to cause difficulty in molding if the amount exceeds 2000 parts by weight.

The mold releasing agent (inner mold releasing agent) employed in the present invention is not particularly restricted but may be selected from fatty acid and its metallic salt, natural wax, synthetic wax and the like, for example. The amount of the mold releasing agent is preferably 0.5 to 3 parts by weight, and more preferably, 1.5 to 2.2 parts by weight with respect to the total amount of 100 parts by weight of the epoxy resin.

The colorant employed in the present invention is not particularly restricted but may be prepared from a pigment such as carbon black, for example. The amount of the colorant is preferably 0.03 to 3.0 parts by weight, more preferably 0.7 to 1.8 parts by weight with respect to the total amount of 100 parts by weight of the epoxy resin.

The finishing agent employed in the present invention is not particularly restricted but may be prepared from vinyltrimethoxysilane, glycidyl trimethoxysilane or the like, for example. The amount of the finishing agent is preferably 0.5 to 20 parts by weight, more preferably 1.2 to 16 parts by weight with respect to the total amount of 100 parts by weight of the epoxy resin.

Further, the inventive composition may be properly blended with arbitrary additives such as a flame retarder such as antimony trioxide, an oxidation inhibitor, and the like.

The inventive composition can be prepared by kneading the aforementioned epoxy resin, hardener, flexibilizer, hardening accelerator, filler, mold releasing agent, colorant and finishing agent, as well as other components if necessary, by an ordinary method with a heating roll or the like, and can be molded by an ordinary method. The flexibilizer may be pre-reacted with the epoxy resin serving as a main agent.

In the inventive epoxy resin composition for sealing a semiconductor, novel silicone containing hydroxyphenyl groups on ends of and/or in the molecules, prepared from a copolymer of denatured silicone oil having hydroxyphenyl groups, denatured silicone oil having epoxy groups and/or bifunctional epoxy resin is employed as a flexibilizer, whereby dispersibility of silicone components in the matrix is further improved, so that the hardened body is tough and improved in heat resistance and moisture resistance.

Due to employment of such novel silicone, dispersibility of the silicone components in the matrix is improved and the hardened body maintains heat resistance and moisture resistance and has a low thermal expansion coefficient as well as a low elastic modulus. Thus, it is possible to provide an extremely tough hardened body at a high glass-transition temperature which is substantially identical to or in excess of that in the conventional case.

DESCRIPTION OF THE PREFERRED EMBODIMENTS

Example 1

130 parts by weight of denatured silicone oil ($a^1$) having mean molecular weight of 1080 and a phenolic hydroxyl equivalent of 500, being expressed in the following general formula:

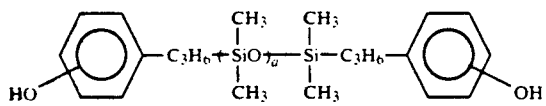

50 parts of denatured silicone oil ($b^1$) having mean molecular weight of 3250 and an epoxy equivalent of 1600, being expressed in the following general formula:

and 0.5 parts by weight of triphenylphosphine were reacted at 150° C. for 20 hours with blowing of nitrogen, to obtain a pre-reactant (flexibilizer A) (epoxy group reactivity: 97%).

Epoxy resin (EOCN1020, WPE 200 by Nippon Kayaku Co., Ltd.) for serving as a main agent, brominated phenol novolak epoxy resin (BREN-S, WPE 280 by Nippon Kayaku Co., Ltd.), phenol novolak resin (PSF4261 by Gun-ei Chemical Industry Co., Ltd.; hydroxyl equivalent: 106) serving as a hardener, a hardening accelerator (triphenylphosphine), a flexibilizer, an inorganic filler (fused silica: RD-8 by Tatsumori Ltd.), antimony trioxide (by Mikuni Smelting & Refining Co., Ltd.), a silane coupling agent (KBM403 by Shin-Etsu Chemical Co., Ltd.), an inner mold releasing agent (carnauba wax) and a colorant (carbon black) were mixed in ratios shown in Table 1, and kneaded through a heating roll, to obtain a epoxy resin composition for sealing a semiconductor.

The as-formed composition was transfer-molded at 175° C. for two minutes, to prepare hardening test pieces.

20 such test pieces were subjected to measurement of bending elastic moduli (JIS K 6911), bending strength values (JIS K 6911), glass-transition temperatures by thermomechanical analysis (TMA measurement), thermal expansion coefficients and package cracking properties after 100 heat cycles ($-196°$ C. $\times 30$ sec. to 260° C. $\times 30$ sec.). Table 1 shows the results.

Examples 2 to 5

200 parts by weight of denatured silicone oil ($a^2$) of a similar structure to the denatured silicon oil ($a^1$), having phenolic hydroxyl groups on both ends of molecular chains, mean molecular weight of 4050 and a hydroxyl equivalent of 2000, 20 parts of denatured silicon oil ($b^2$) of a similar structure to the denatured silicone oil ($b^1$), having epoxy groups on both ends of molecular chains, mean molecular weight of 1230 and an epoxy equivalent of 600, and 0.5 parts by weight of triphenylphosphine were reacted at 150° C. for 20 hours with blowing of nitrogen, to obtain a pre-reactant (flexibilizer B) (epoxy group reactivity: 95%).

150 parts by weight of the denatured silicon oil ($a^2$), 50 parts by weight of the denatured silicone oil ($b^1$) and 0.4 parts by weight of triphenylphosphine were reacted at 150° C. for 20 hours with blowing of nitrogen, to obtain a pre-reactant (flexibilizer C) (epoxy group reactivity: 98%).

60 parts by weight of the denatured silicone oil ($a^1$), 100 parts by weight of denatured silicone oil ($b^3$) of 12000 in mean molecular weight and 2500 in epoxy equivalent and having epoxy groups in its molecular chains, being expressed in the following general formula:

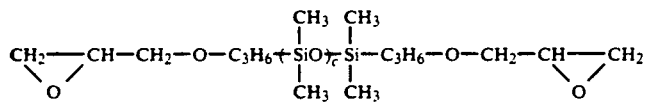

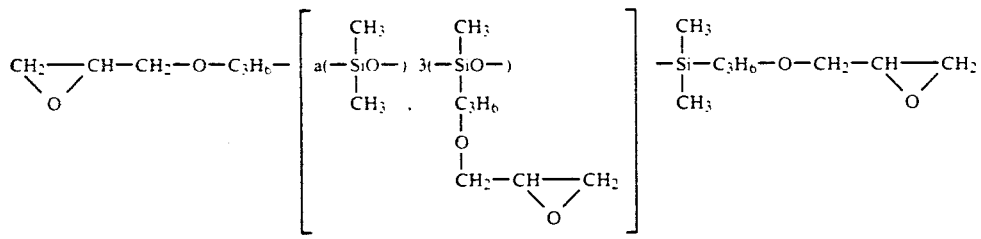

and 0.4 parts by weight of triphenylphosphine were reacted at 150° C. for 20 hours with blowing of nitrogen, to obtain a pre-reactant (flexibilizer D) (epoxy group reactivity: 93%).

50 parts by weight of the flexibilizer B, 100 parts by weight of EOCN1020, and 0.5 parts by weight of triphenylphosphine were pre-reacted at 150° C. for 20 hours with blowing of nitrogen, to obtain a flexibilizer E, which was reacted with part of epoxy resin serving as a main agent (hydroxyphenyl group reactivity: 93%).

The flexibilizers B to E were used as shown in Table 1 to obtain epoxy resin compositions for sealing semiconductors in a similar manner to Example 1, excepting that other components were blended.

Then, hardening test pieces were prepared similarly to Example 1, and subjected to measurement of characteristics. Table 1 also shows the results.

Reference Examples 1 and 2

Flexibilizers were prepared from Araldite GY298 by Chiba-Geigy Ltd. (Reference Example 1) and DER 736 by Dow Chemical Co. (Reference Example 2), to obtain epoxy resin compositions shown in Table 1, in a similar manner to Example 1.

Then, test pieces were prepared similarly to Example 1, and characteristics thereof were examined. Table 1 also shows the results. Reference Example 3

An epoxy resin composition shown in Table 1 was obtained in a similar manner to Example 1, excepting that no flexibilizer was employed.

Then, test pieces were prepared similarly to Example 1, and characteristics thereof were examined. Table 1 also shows the results.

TABLE 1

| | Epoxy Resin (part) | | Phenol Hardening Agent (part) | Hardening | Flexibilizer (part) | | | | | | | Inorganic | Antimony |
|---|---|---|---|---|---|---|---|---|---|---|---|---|---|
| | EOCN 1020 (WPE200) | BREN-S (WPE280) | (Hydroxyl Equivalent 106) | Accelator (part)*1 | A | B | C | D | E*2 | GY 298 | DER 736 | Filler (part)*3 | Trioxide (part) |
| Example | | | | | | | | | | | | | |
| 1 | 100 | 10 | 55 | 1 | 23 | — | — | — | — | — | — | 540 | 10 |
| 2 | 100 | 10 | 56 | 1 | — | 23 | — | — | — | — | — | 540 | 10 |
| 3 | 100 | 10 | 56 | 1 | — | — | 23 | — | — | — | — | 540 | 10 |
| 4 | 100 | 10 | 55.6 | 1 | — | — | — | 23 | — | — | — | 540 | 10 |
| 5 | 54 | 10 | 56 | 1 | — | — | — | — | 69 | — | — | 540 | 10 |
| Reference Example | | | | | | | | | | | | | |
| 1 | 100 | 10 | 57 | 1 | — | — | — | — | — | 23 | — | 540 | 10 |
| 2 | 100 | 10 | 57 | 1 | — | — | — | — | — | — | 23 | 540 | 10 |
| 3 | 100 | 10 | 57 | 1 | — | — | — | — | — | — | — | 480 | 10 |

| | Other Material (part)*4 | Bending Elastic Modulus (kg/mm$^2$) | Bending Strength (kg/mm) | Glass Transition Temperature (°C.) | Thermal Expansion Coefficient × 10$^6$ (°C.$^{-1}$) | Heat Cycle Failure Rate (%) |
|---|---|---|---|---|---|---|
| Example | | | | | | |
| 1 | 13 | 1210 | 13.0 | 159 | 16 | 5 |
| 2 | 13 | 1190 | 12.8 | 160 | 16 | 0 |
| 3 | 13 | 1230 | 13.5 | 160 | 17 | 0 |
| 4 | 13 | 1030 | 12.2 | 158 | 16 | 0 |
| 5 | 13 | 1200 | 13.2 | 160 | 16 | 0 |
| Reference Example | | | | | | |
| 1 | 13 | 1320 | 14.0 | 146 | 19 | 45 |
| 2 | 13 | 1340 | 13.8 | 149 | 19 | 65 |
| 3 | 13 | 1630 | 17.0 | 157 | 18 | 100 |

[Note]
*1: Triphenylphosphine
*2: pre-reactant with part of epoxy resin serving as main agent
*3: fused silica (RD-8 by Tatsumori Ltd.)
*4: 7 parts of silane coupling agent (KBM 403 by Shin-Etsu Chemical Co., Ltd.), 3 parts of inner mold releasing agent (carnauba wax) and 3 parts of coloring agent (carbon black)

Examples 6 to 10

300 parts by weight of the denatured silicone oil (a$^1$), 20 parts by weight of bifunctional epoxy resin (Epikote 828 by Yuka Shell Epoxy Co.) (c$^1$) having mean molecular weight of 380 and an epoxy equivalent of 190, being expressed in the following general formula:

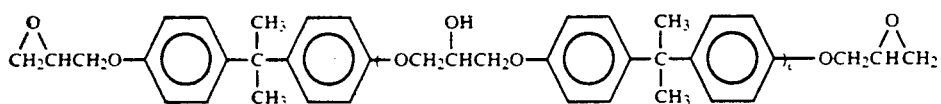

and 0.5 parts by weight of triphenylphosphine were reacted at 150° C. for 20 hours with blowing of nitrogen, to obtain a pre-reactant (flexibilizer F) (epoxy group reactivity: 95%).

200 parts by weight of the denatured silicone oil (a²), 25 parts by weight of bifunctional epoxy resin (Epikote 1004 by Yuka Shell Epoxy Co.) of a similar structure to the above bifunctional epoxy resin (c¹) and having epoxy groups on both ends of molecular chains with mean molecular weight of 1600 and an epoxy equivalent of 900, and 0.5 parts by weight of triphenylphosphine were reacted at 150° C. for 20 hours with blowing of nitrogen, to obtain a pre-reactant (flexibilizer G) (epoxy resin reactivity: 90%).

400 parts by weight of denatured silicone oil (a²) having phenolic hydroxyl groups on both ends of and in its molecular chains with mean molecular weight of about 11000 and a hydroxyl equivalent of 2300, being expressed in the following general formula:

gen, to obtain a pre-reactant (flexibilizer H) (epoxy group reactivity: 83%).

200 parts by weight of the denatured silicone oil (a¹), 20 parts by weight of bifunctional epoxy resin (YK-4000 by Yuka Shell Epoxy Co.) having an epoxy equivalent of 197 in biphenyl chains, being expressed in the following general formula:

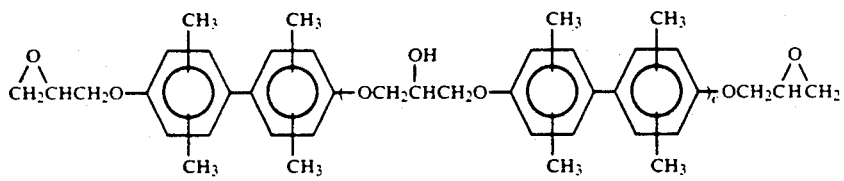

and 0.5 parts by weight of triphenylphosphine were reacted at 150° C. for 20 hours with blowing of nitrogen, to obtain a pre-reactant (flexibilizer I) (epoxy group reactivity: 93%)

50 parts by weight of the flexibilizer F, 100 parts by weight of EOCN1020, and 0.5 parts by weight of triphenylphosphine were pre-reacted at 150° C. for 20 hours with blowing of nitrogen, to obtain a flexibilizer J which was pre-reacted with part of epoxy resin serving as a main agent (hydroxyphenyl group reactivity: 89%).

The flexibilizers F to J were used as shown in Table 2, to obtain epoxy resin compositions for sealing semi-

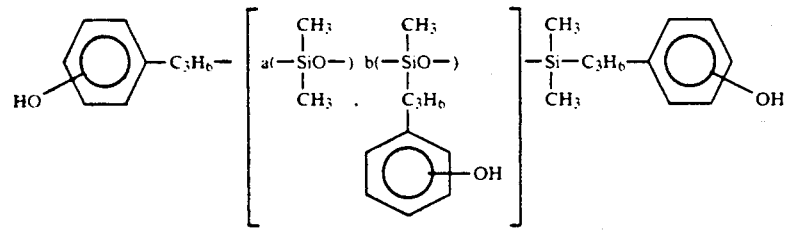

26 parts by weight of the bifunctional epoxy resin (c²), and 0.4 parts by weight of triphenylphosphine were reacted at 150° C. for 20 hours with blowing of nitroconductors in a similar manner to Example 1, excepting that other components were blended.

Then, hardening test pieces were prepared similarly to Example 1, and characteristics thereof were examined. Table 2 shows the results.

TABLE 2

| | Epoxy Resin (part) | | Phenol Hardening Agent (part) | Hardening Accelerator | Flexibilizer (part) | | | | | | | Inorganic Filler | Antimony Trioxide |
|---|---|---|---|---|---|---|---|---|---|---|---|---|---|
| | EOCK 1020 (WPE200) | BREN-S (WPE280) | (Hydroxyl Equivalent 106) | (part)*¹ | F | G | H | I | J*² | GY 298 | DER 736 | (part)*³ | (part) |
| Example | | | | | | | | | | | | | |
| 6 | 100 | 10 | 53 | 1 | 21 | — | — | — | — | — | — | 525 | 10 |
| 7 | 100 | 10 | 56 | 1 | — | 23 | — | — | — | — | — | 540 | 10 |
| 8 | 100 | 10 | 56 | 1 | — | — | 21.5 | — | — | — | — | 513 | 10 |
| 9 | 100 | 10 | 54 | 1 | — | — | — | 22 | — | — | — | 530 | 10 |
| 10 | 58 | 10 | 53 | 1 | — | — | — | — | 63 | — | — | 525 | 10 |
| Reference Example | | | | | | | | | | | | | |
| 1 | 100 | 10 | 57 | 1 | — | — | — | — | — | 20 | — | 540 | 10 |
| 2 | 100 | 10 | 57 | 1 | — | — | — | — | — | — | 20 | 540 | 10 |
| 3 | 100 | 10 | 57 | 1 | — | — | — | — | — | — | — | 480 | 10 |

| Other Material | Bending Elastic Modulus | Bending Strength | Glass Transition | Thermal Expansion Coefficient × 10⁶ | Heat Cycle |

TABLE 2-continued

|  | (part)*4 | (kg/mm²) | (kg/mm) | Temperature (°C) | (°C.⁻¹) | Failure Rate (%) |
|---|---|---|---|---|---|---|
| Example |  |  |  |  |  |  |
| 6 | 13 | 1250 | 11.0 | 162 | 16 | 0 |
| 7 | 13 | 1160 | 10.8 | 161 | 16 | 0 |
| 8 | 13 | 1010 | 10.2 | 163 | 15 | 0 |
| 9 | 13 | 1270 | 12.0 | 160 | 16 | 0 |
| 10 | 13 | 1230 | 11.3 | 159 | 16 | 0 |
| Reference Example |  |  |  |  |  |  |
| 1 | 13 | 1320 | 14.0 | 146 | 19 | 45 |
| 2 | 13 | 1340 | 13.8 | 149 | 19 | 65 |
| 3 | 13 | 1630 | 17.0 | 157 | 18 | 100 |

[Note]
*1 Triphenylphosphine
*2 pre-reactant with part of epoxy resin serving as main agent
*3 fused silica (RD-8 by Tatsumori Ltd.)
*4 7 parts of silane coupling agent (KBM 403 by Shin-Etsu Chemical Co., Ltd.), 3 parts of inner mold releasing agent (carnauba wax) and 3 parts of coloring agent (carbon black)

As clearly understood from the results shown in Tables 1 and 2, a hardened body of the inventive epoxy resin composition for sealing a semiconductor has high heat resistance and a low thermal expansion coefficient, and attains a high glass-transition temperature which is similar to or higher than that of the conventional one. Thus, it is understood that the inventive epoxy resin composition is properly applicable to sealing of a semiconductor.

What is claimed is:

1. An epoxy resin composition for sealing a semiconductor, containing a flexibilizer, epoxy resin, a hardener, a hardening accelerator, a filler, a mold releasing agent, a colorant and a finishing agent, wherein
said flexibilizer is prepared from silicone containing hydroxyphenyl groups on ends of and/or in its molecules, being formed of a copolymer of denatured silicone oil A having hydroxyphenyl groups, denatured silicone oil B havig epoxy groups and/or bifunctional epoxy resin having epoxy groups on both ends,
said denatured silicone oil A being expressed in the following general formula (I):

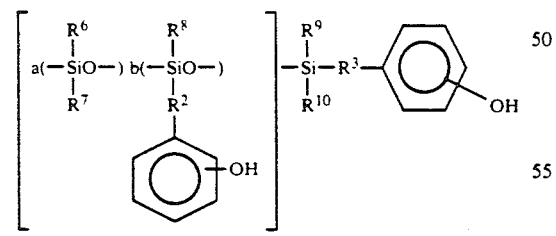

where
R¹ and R³ bivalent organic groups respectively, R⁴ to R¹⁰ represent alkyl groups having carbon numbers of 1 to 10, alkoxy groups having carbon numbers of 1 to 10, hydroxyalky group having carbon numbers of 1 to 10, or phenyl groups, or fluorine displaced alkyl groups having carbon numbers of 1 to 10 respectively, a represents an integer in a range of 5 to 300 and b represents an integer in a range of 0 to 10, 0≦[b/(a+b)]≦0.32, said denatured silicon oil B being expressed in the following general formula (II):

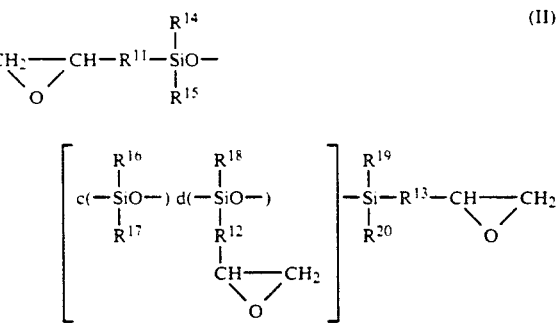

where
R¹¹ and R¹³ represent bivalent groups respectively, R¹⁴ to R²⁰ represent alkyl groups having carbon numbers of 1 to 10, alkoxy groups having carbon numbers of 1 to 10, hydroxyalkyl groups having carbon numbers of 1 to 10, phenyl groups or fluorine displaced alkyl groups having carbon numbers of 1 to 10 respectively, c represents an integer in a range of 5 to 300 and d represents an integer in a range of 0 to 10, 0≦[d/(c+d)]≦0.32,
said bifunctional epoxy resin being expressed in the following general formula (III):

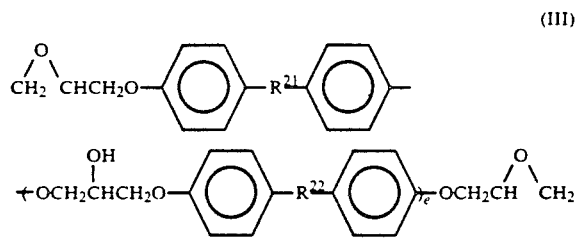

where
R²¹ and R²² represent direct-coupling or bivalent organic groups respectively and e represents an integer in a range of 0 to 20, and hydrogen atoms of benzene rings may be displaced.

2. An epoxy resin composition in accordance with claim 1, wherein said flexibilizer is prepared from a copolymer of said denatured silicon oil A and said denatured silicon oil B.

3. An epoxy resin composition in accordance with claim 1, wherein said flexibilizer is prepared from a copolymer of said denatured silicone oil A and said bifunctional epoxy resin.

4. An epoxy resin composition in accordance with claim 1, wherein said denatured silicon oil A and/or B has mean molecular weight of not more than 2000.

5. An epoxy resin composition in accordance with claim 1, wherein said denatured silicone oil A and/or B has mean molecular weight of greater than 2000.

6. An epoxy resin composition in accordance with claim 1, wherein $R^1$ to $R^3$ in said general formula (I) represent alkylene groups having carbon numbers of 1 to 5.

7. An epoxy resin composition in accordance with claim 1, wherein $R^4$ to $R^{10}$ in said general formula (I) represent alkyl groups having carbon numbers 1 to 5, alkoxy groups having carbon numbers of 1 to 5, hydroxyalkyl groups or carbon numbers of 1 to 5, phenyl groups or fluorine displaced alkyl groups having carbon numbers of 1 to 5 respectively.

8. An epoxy resin composition in accordance with claim 1, wherein a in said general formula (I) represents an integer in a range of 7 to 250.

9. An epoxy resin composition in accordance with claim 1, wherein b/(a+b) in said general formula (I) is 0 to 0.25.

10. An epoxy resin composition in accordance with claim 1, wherein said denatured silicone oil A has a hydroxyl equivalent of said hydroxyphenyl groups of 100 to 13000.

11. An epoxy resin composition in accordance with claim 1, wherein the number of said hydroxyphenyl groups contained in said denatured silicone oil A is 2 to 12 per molecule.

12. An epoxy resin composition in accordance with claim 1, wherein said denatured silicone oil A is selected from the following group:

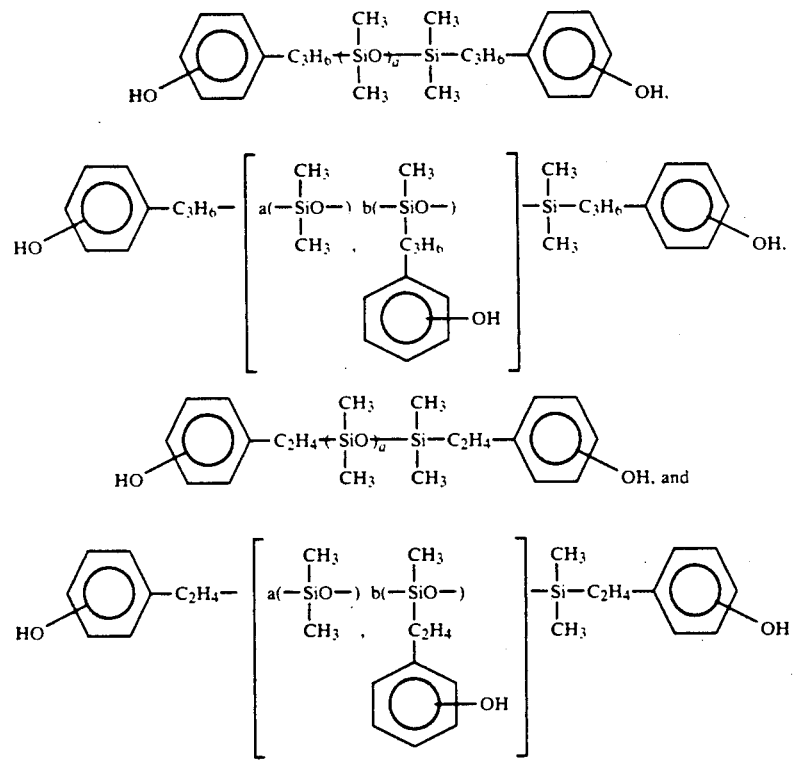

13. An epoxy resin composition in accordance with claim 1, wherein c in said general formula (II) represents an integer in a range of 7 to 250.

14. An epoxy resin composition in accordance with claim 1, wherein d/(c+d) in said general formula (II) is 0 to 0.25.

15. An epoxy resin composition in accordance with claim 1, wherein said denatured silicone oil B has an epoxy equivalent of 100 to 13000.

16. An epoxy resin composition in accordance with claim 1, wherein the number of said epoxy groups contained in said denatured silicone oil B is 2 to 12 per molecule.

17. An epoxy resin composition in accordance with claim 1, wherein said denatured silicone oil B is selected from the following group:

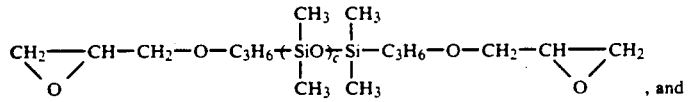

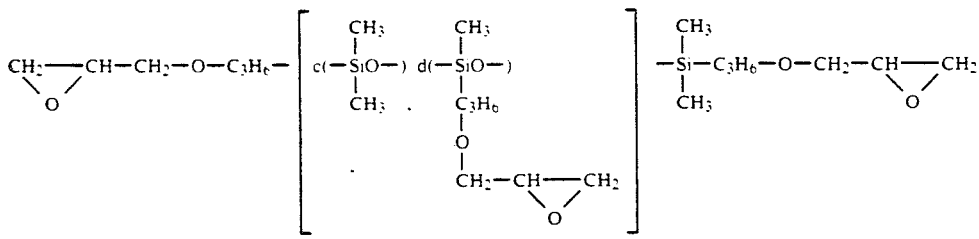

18. An epoxy resin composition in accordance with claim 1, wherein e in said general formula (III) represents an integer in a range of 0 to 16.

19. An epoxy resin composition in accordance with claim 1, wherein said bifunctional epoxy resin is selected from the following group:

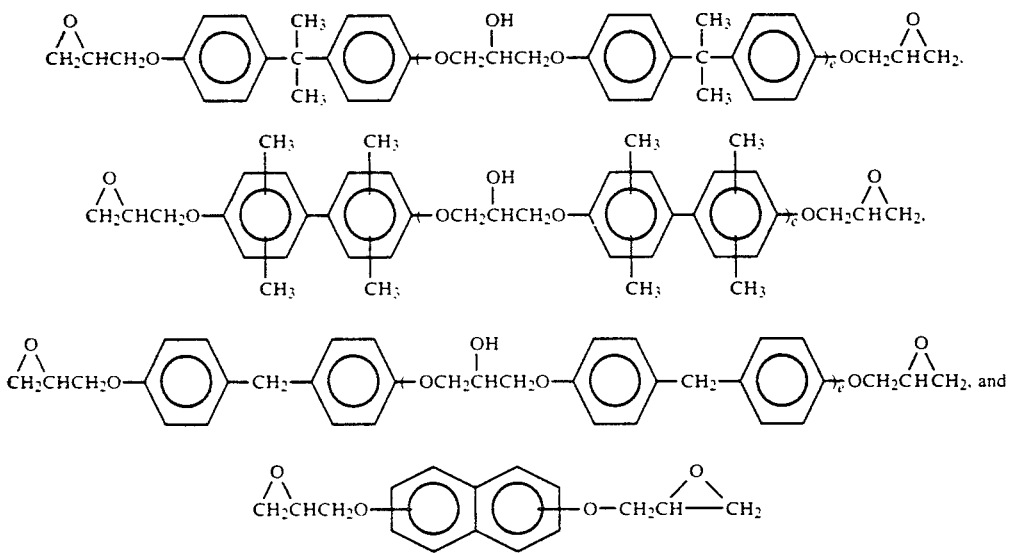

20. An epoxy resin composition in accordance with claim 1, wherein the ratio of phenolic hydroxyl groups contained in said denatured silicone oil A to said epoxy groups contained in said denatured silicone oil B and/or said bifunctional epoxy resin, i.e., an equivalent ratio of said phenolic hydroxyl groups to said epoxy groups is 1 to 30.

21. An epoxy resin composition in accordance with claim 1, wherein at least 70 percent, of said epoxy groups contained in said denatured silicone oil B and said bifunctional epoxy resin are reacted with phenolic hydroxyl groups contained in said denatured silicone oil A.

22. An epoxy resin composition in accordance with claim 1, wherein X/(X+Y) is 0.03 to 0.4, assuming that X represents the weight of said denatured silicone oil A, or the total weight of said denatured silicone oil A and said denatured silicone oil B if said denatured silicone oil B is employed, and Y represents the total weight of said epoxy resin serving as a main agent and organic components such as said hardener, including said bifunctional epoxy resin if the same is employed.

23. An epoxy resin composition in accordance with claim 1, wherein the ratio of the total equivalent of said epoxy groups contained in said epoxy resin employed as a main agent and said flexibilizer to the total equivalent of groups contained in said hardener and said flexibilizer concerning reaction with said epoxy groups is 0.7 to 1.3.

24. An epoxy resin composition in accordance with claim 1, wherein the amount of said hardening accelerator is 0.03 to 2 percent by weight, with respect to overall said composition.

25. An epoxy resin composition in accordance with claim 1, wherein the amount of said filler is 250 to 2000 parts by weight, with respect to the total amount of 100 parts by weight of epoxy resin.

26. An epoxy resin composition in accordance with claim 1, wherein the amount of said mold releasing agent is 0.5 to 3 parts by weight, with respect to the total amount of 100 parts by weight of epoxy resin.

27. An epoxy resin composition in accordance with claim 1, wherein the amount of said colorant is 0.3 to 3.0 parts by weight, with respect to the total amount of 100 parts by weight of epoxy resin.

28. An epoxy resin composition in accordance with claim 1, wherein the amount of said finishing agent is 0.5 to 20 parts by weight, with respect to the total amount of 100 parts by weight of epoxy resin.

* * * * *